Nov. 1, 1932.  E. KARRER  1,885,356
METHOD OF WEIGHING
Filed May 21, 1929
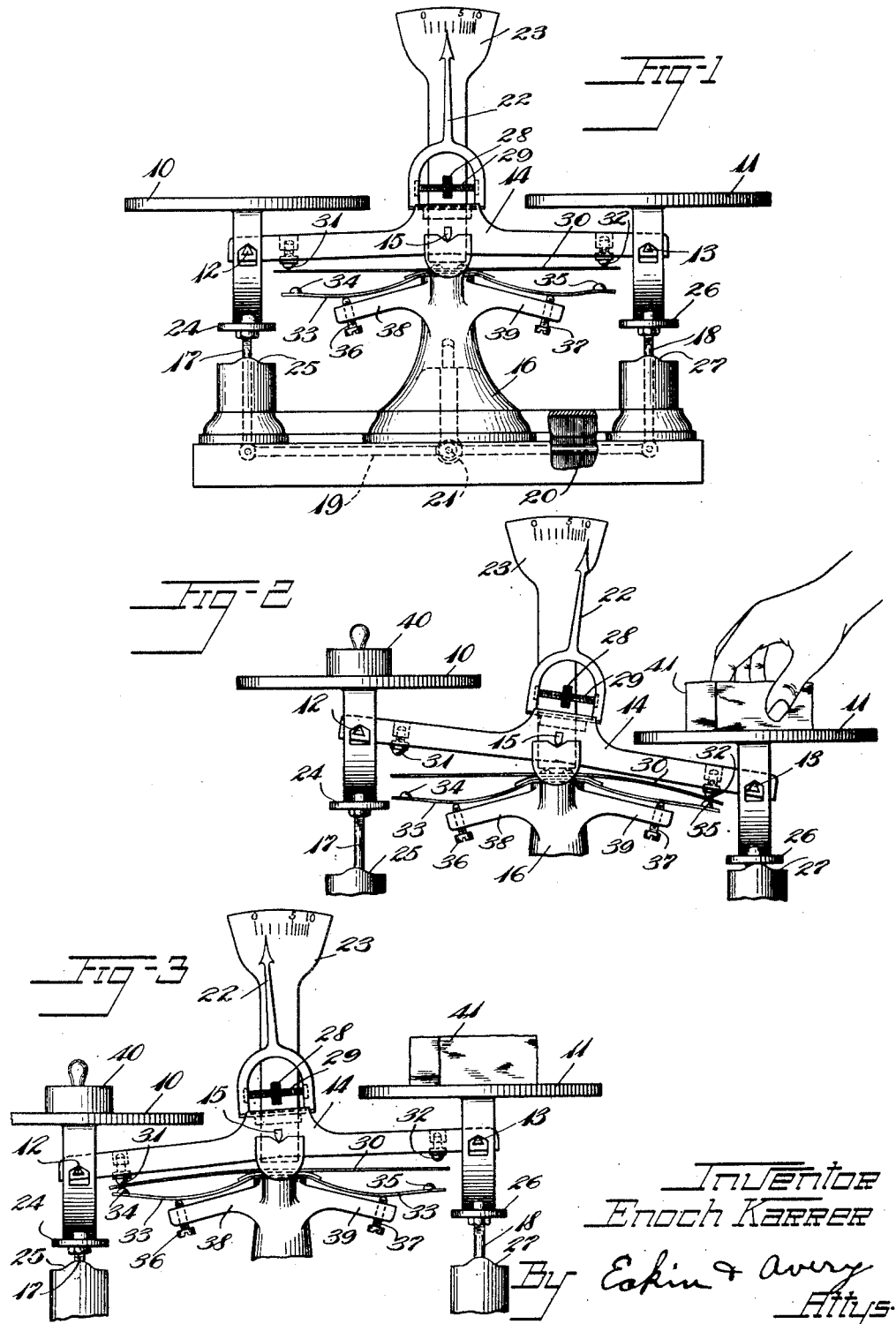
Inventor
Enoch Karrer
By Eakin & Avery
Attys.

Patented Nov. 1, 1932

1,885,356

UNITED STATES PATENT OFFICE

ENOCH KARRER, OF AKRON, OHIO, ASSIGNOR TO THE B. F. GOODRICH COMPANY, OF NEW YORK, N. Y., A CORPORATION OF NEW YORK

METHOD OF WEIGHING

Application filed May 21, 1929. Serial No. 364,767.

This invention relates to the weighing of materials and is of especial value in rapidly obtaining the approximate weights of a succession of articles, as in determining which of the articles are over weight and which are under weight with relation to a determinate standard weight.

Economy of time in the weighing of articles is the chief object of the invention, a more specific object being to avoid the delay of waiting for or effecting static balance of a scale to obtain the weight reading.

I accomplish these objects in the preferred practice of my invention by applying to the article a determinate force-distance regimen, which is to say by performing a determinate amount of work upon the article and thereby imparting to it a determinte amount of kinetic energy, which amount preferably is modified by a force such as that of gravity acting upon the article, and then determining approximately the mass of the article by noting the distance, in a counter force-distance regimen, through which the article is carried by its kinetic energy or that of a system of which it is a part.

My new method is especially well adapted to be practiced by the use of a weighing device or scale of the general type of that shown in my Patent No. 1,798,538, March 31, 1931, and for the purpose of clear illustration of the procedure constituting the present method, but not for the purpose of limitation, a device of that general type is shown in the accompanying drawing, of which:

Fig. 1 is an elevation of a scale adapted for the practice of my invention in its preferred form, in balance, a part being sectioned and broken away.

Fig. 2 is an elevation of parts of the same showing the positions of the parts in readiness for the application of the determinate force-distance regimen to the article of which the mass or weight is to be determined.

Fig. 3 is a similar view showing the positions to which the parts are moved, in the counter force-distance regimen, by the kinetic energy imparted in the first force-distance regimen.

Referring to the drawing, the device here shown for the practice of my invention consists of a parallel-motion scale having scale pans 10, 11 mounted upon the usual "knife-edges" 12, 13 at the respective ends of a scale beam 14 fulcrumed by means of a "knife-edge" 15 upon the scale standard 16, the downwardly-extending yokes of the scale pans having rigidly secured thereto respective vertical rods 17, 18 which are hinged to outer ends of respective bars 19, 20, each having an effective length equal to half that of the scale beam 14, and the bars 19, 20 having their inner ends pivoted in the scale standard 16 at 21, directly under the "knife-edge" 15, so that the scale beam 14 and the bars 19, 20, with the vertical bars 17, 18 and the scale pans 10, 11, constitute a parallel motion and the scale pans consequently are maintained with their upper faces horizontal as they rise and descend.

The scale is provided with an indicator 22 extending upward from the middle of the scale beam and with a dial 23 upon which the indicator reads zero when the scale pans are at one limit of their movement out of balance, which limit is imposed by a stop-disc 24 on the yoke of the scale-pan 10 abutting the top of a hollow column 25 through which the rod 17 extends, the movement of the scale pans in the opposite direction being similarly limited, at the maximum reading of the indicator 22, by a stop-disc 26 on the yoke of the scale pan 11 abutting the top of a hollow column 27 surrounding the rod 18.

A balancing weight 28 is mounted on a screw 29 mounted in an arch formed in the base of the indicator.

Lightly opposing movement of the scale beam 14 out of horizontal position in either direction a flat spring 30 is mounted on the standard 16, its end portions lightly bearing upward against the heads of respective abutment screws 31, 32 when the beam is horizontal, and more strongly opposing an extreme movement of the beam in either direction but operative only when the beam has made a substantial departure from the horizontal position a stronger spring 33 is mounted upon the standard 16 and has on its end portions respective abutment knobs 34, 35 adapted to be engaged by the respective end portions of the light spring 30, so that in the extreme parts of the latter's range it is assisted by the stiff spring 33.

Under each arm of the spring 33 a set screw, 36 or 37, is threaded through a bracket 38 or 39, formed on the standard 16 and bears against the under face of the spring, the set screw being adjustable to determine the strain under which the spring will be placed when the scale pans are at the limit of their movement.

In the practice of my improved method by means of this apparatus, a standard weight 40 is placed upon one of the scale pans, the article to be weighed, such as the block 41, is placed upon the other scale pan and the latter scale pan is depressed by the operator to the limit of its movement, as shown in Fig. 2, which puts the adjacent arms of both of the springs 30, 33 under strain.

The operator then quickly withdraws his hand and thereby permits the springs to raise the scale pan carrying the block 41 and, by applying a determinate force-distance regimen to the system including the scale pans and the articles thereon, the springs perform upon the system a determinate amount of work, which is in part consumed by the resistance of gravity if the block 41 is heavier than the weight 40, with only a part going into kinetic energy, and which, on the other hand, is augmented by the force of gravity, with resultant high kinetic energy, if the block 41 is lighter than the weight 40.

The velocity of the system causes the indicator to continue past the position it would occupy in static balance of the system, until the motion is stopped and reversed by the other arms of the springs, and when the block 41 is light the indicator will go farther than when the block is heavy not only because more of the initial spring energy has gone into kinetic energy but also because the continued resistance of gravity is the less in the case of the light block and, if the block 41 is lighter than the weight 40, the force of gravity operates, throughout the initial impulse and also throughout the application of the retarding force, to give a long throw to the indicator.

Having noted on the scale the maximum throw of the indicator with a block 41 of equal mass with the weight 40, the operator can readily determine, by noting the throw of the indicator in the operation as described and without waiting for static balance, not only whether a given block is over weight or under weight with relation to the standard weight 40, but also, with a high degree of accuracy, the amount by which it differs from the standard weight, and in the case of test samples or the like which is desired to cut to a standard weight he is enabled to determine quickly how much of the material is required to be removed, after which he can effect the removal of the proper part of the material and then check the result by either repeating the dynamic weighing operation described or by using the scale in the manner of an ordinary balance, or by both.

The method not only results in a great saving of time, especially in the course of a long succession of weighings such as are required for cutting test samples or the like to standard weight, but also gives a magnified reading as compared with a static balance of a spring scale, since a factor in the throw of the indicator is the product of the force of gravity times the distance of movement instead of merely the force of gravity unmultiplied, and accuracy also probably results from the fact that the friction involved is the friction of motion and not static friction.

It is especially convenient to perform the method by means of a parallel motion scale, as such a scale provides accuracy of result without great care in the placing of the article's center of gravity with relation to the pan or great care in the application and removal of the manual force.

The use of the two springs of different strengths as described provides a desirable force-distance regimen permitting the dynamic weighing of articles of widely different weights and also adapts the scale of both dynamic and static weighing with a desirably large-scale reading as to static weighing, the light spring alone being effective throughout a wide range in static weighing.

Variations of my process are possible within the scope of the appended claims.

I claim:

1. The method of weighing which comprises applying to the article to be weighed a determinate amount of energy in opposition to gravity to give it velocity, subjecting it to a stopping force in addition to gravity, ascertaining the distance through which it is carried by velocity against gravity and the said additional stopping force, and gauging the weight of the article by the magnitudes of the said distance and the stopping forces.

2. The method of weighing which comprises subjecting the article to a substantially constant force acting continuously in the same direction and, while so doing, causing a determinate amount of energy to be exerted upon the article to give it velocity in opposition to the said force, subjecting it to a stopping force in addition to the said constant force, ascertaining the distance through which it is carried by velocity against said constant force and said additional stopping force, and gauging the weight of the article by the magnitudes of the said distance and the stopping forces.

In witness whereof I have hereunto set my hand this 18th day of May, 1929.

ENOCH KARRER.